United States Patent [19]

Wilson et al.

[11] Patent Number: 4,692,614
[45] Date of Patent: Sep. 8, 1987

[54] ROTATIONAL MOTION FLUID LOOP SENSOR USING MAGNETICALLY LEVITATED DETECTING ELEMENT

[75] Inventors: David J. M. Wilson; Paul E. G. Cope, both of Hampshire, England

[73] Assignee: The Marconi Company Limited, England

[21] Appl. No.: 855,184

[22] Filed: Apr. 23, 1986

[30] Foreign Application Priority Data

Apr. 27, 1985 [GB] United Kingdom ............... 8510771

[51] Int. Cl.⁴ .............................................. G01P 15/00
[52] U.S. Cl. .............................. 250/231 R; 73/516 R; 73/517 A
[58] Field of Search .......................... 250/229, 231 R; 73/516 R, 516 LM, 517 A

[56] References Cited

U.S. PATENT DOCUMENTS

| 3,516,294 | 6/1970 | Schmieder | 73/516 LM |
| 3,530,727 | 9/1970 | Albert | 73/516 R |
| 4,043,204 | 8/1977 | Hunter | 73/516 R |
| 4,047,439 | 9/1977 | Russell et al. | 73/516 R |
| 4,528,851 | 7/1985 | Ozols | 73/516 LM |

Primary Examiner—David C. Nelms
Assistant Examiner—S. Allen
Attorney, Agent, or Firm—Kirschstein, Kirschstein, Ottinger & Israel

[57] ABSTRACT

A rotational motion sensor has a circular, tubular body (1) filled with a fluid. A sensor head (6) forming part of the body houses a movable detecting element in the form of a piston (7) which is magnetically levitated so that it is kept out of contact with the sensor body. Movement of the piston is detected in a number of different ways including using a variable magnetic reluctance pick-off (4, 5).

9 Claims, 10 Drawing Figures

ROTATIONAL MOTION FLUID LOOP SENSOR USING MAGNETICALLY LEVITATED DETECTING ELEMENT

The present invention concerns rotational motion sensors. Such sensors find many possible applications. For example, many space missions in operation today demand a high degree of spacecraft stability and control, the obvious examples of which are scientific satellites. However, those satellites whose tasks may prevent them receiving external reference signals for long periods of time, also require high signal quality and accuracy from both internal and external sensors in order to derive the spacecraft attitude to within a reasonable accuracy at all times. The specific functions of the internal sensor in this case mean that the stability and noise spectral density play a critical role.

The present invention has for an object to alleviate these particular problems and provide a system capable of sensing small rotational movements of less than one milliradian in amplitude and low velocities and accelerations as defined by oscillations of frequencies between zero and three hertz. In particular, a low noise output is sought for acceleration sensing so that very low levels of acceleration will still be detectable against background noise.

Since present known sensors in this field have spectral densities much higher than that associated with either Johnson noise of 1/f noise of electronic circuitry, a motion detector having a lower spectral density curve can provide better performance even if its sensitivity is low. This is because the sensitivity can be increased using additional electronic amplifiers on the output with their contribution to noise having little effect due to the quantity of noise already present.

Accordingly the present invention consists in a rotational motion sensor comprising a fluid loop and a piston to act as the detecting element which is magnetically levitated to keep it from direct contact with any part of the sensor other than the fluid itself, and which moves in proportion to the motion of the element of fluid it substitutes and which behaves in all dynamical respects to high accuracy as a damped simple harmonic oscillator with respect to the body and tube of the sensor.

A most important feature in the invention is the magnetic levitation of the detecting element (the piston) such that no mechanical contact exists between this and the other parts of the system. This then removes all noise creating friction processes other than viscous friction of the fluid in the tube.

The magnetic forces are also used to provide a centering force for the detecting element. This is adjustable and defines the natural frequency of this detecting element which behaves to high accuracy as a simple damped harmonic oscillator. The frequency regions or bandwidths in which the system acts as a displacement sensor, a velocity sensor and an accelerometer of rotational motion are in turn dependent on the natural frequency of the detecting element.

Another important feature in the invention which distinguishes this method of sensing acceleration from other accelerometers is the degree of freedom of movement given to the detecting element. In other words, the detecting element is not constrained to follow the motion of the sensor body but is allowed to move relative to it as would an element of fluid in its place and the size of the relative displacement is a measure of the acceleration to which the sensor body is subjected.

One embodiment of a rotational sensor according to the present invention will now be described by way of example with reference to the accompanying drawings in which.

Figure 1:
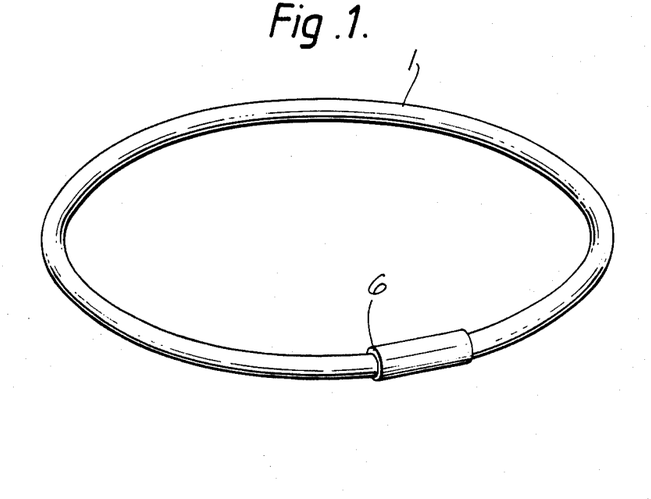
FIG. 1 is a perspective view of a complete sensor.

Referring now to the accompanying drawings, and as shown in FIG. 1, the sensor comprises a tube 1 filled with a fluid of suitably low dyanmic viscosity and is arranged in a closed loop. Only a small section of the fluid loop is used in the sensor head 6 to actually sense fluid movement and here the tube may be narrower to achieve a better response.

Coils 5 energised with an alternating current of approximately 40 kHz frequency are arranged about the tube in the sensor head 6 such that two alternating magnetic fields, symmetrical about the tube axis, penetrate into the tube. These fields are separated along the length of this short section of tube and create a magnetic boundary to the movement of a metallic piston 7 immersed in the fluid in the tube between the coils.

The piston 7 functions as the detecting element of the sensor by moving with the flow of the fluid. It is made such that its density is equal to that of the fluid thus behaving, as closely as possible, as an element of the fluid itself. This means that no response is generated from the sensor as a result of purely linear movements. The detecting element must be non-ferromagnetic and the circumference of the end sections must be conductive. These conductive end sections intrude into concentrated alternating magnetic fields produced by the energized coils and their specially shaped ferrite cores and thus experience repulsive forces. These forces act symmetrically about the tube axis to levitate the detecting element away from the sides of the tube thus ensuring that no coulomb friction is involved with any movement. The magnetic forces produced by the two coil systems also act to push the detecting element in opposite directions along the tube in which it is suspended, thus restoring it always to a central position of minimum energy. It is this axially directed restoring force which produces the damped simple harmonic oscillatory motion of the detecting element.

The relative displacement of the detecting element with respect to the body of the sensor head in response to movements of the whole sensor is the measure of acceleration or other type of motion which is required. Several ways of picking off this displacement can be used including optical, electrical or magnetic methods.

Figure 2:
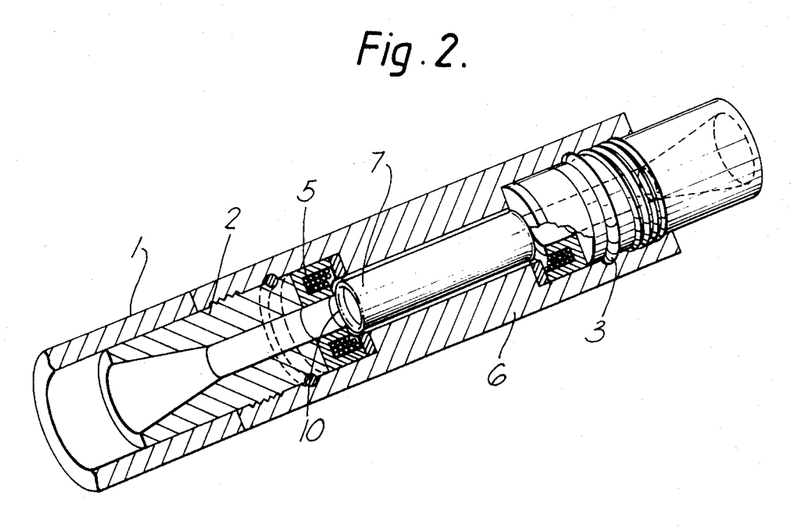
FIG. 2 is a section through the sensor head.
Figures 3, 6, 7:
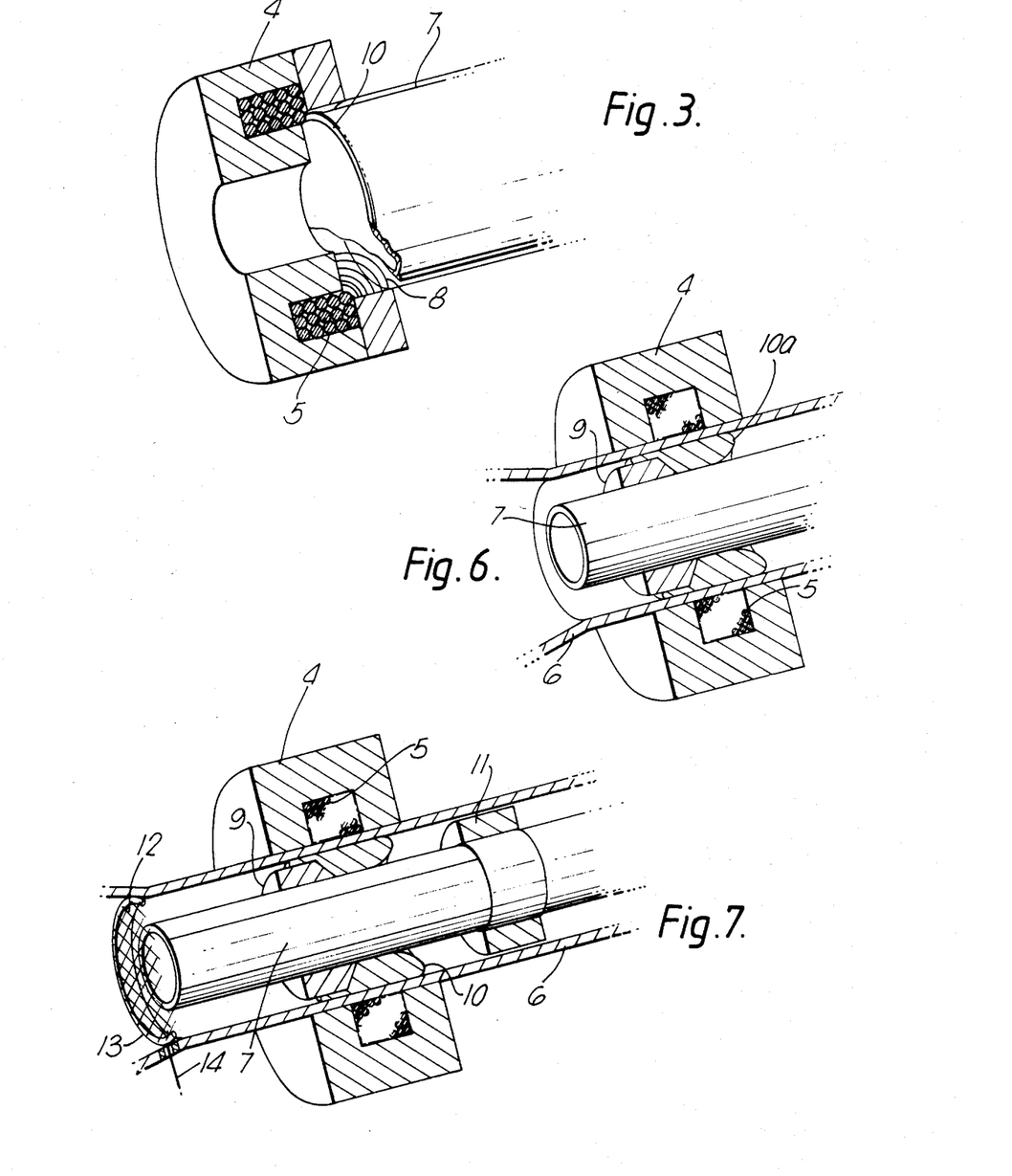
FIG. 3 illustrates the coil, core and detecting element geometries relative to the magnetic flux across the core gap of the sensor head.
FIG. 6 is a section through the sensor head showing the use of a ferrofluid in the sensor.
FIG. 7 is a similar view to FIG. 6 showing a capacitive method of movement detection.

Referring now to FIG. 2 it can be seen that the sensor head comprises ferrite core pieces 4 which house coil windings 5 and which are locked in the sensor head body 6 by a coil clamp 2. The coil clamp screws into the sensor head body until it clamps the core between itself and a shoulder 9 of the sensor head body. A sealing O-ring 3 is also positioned between the coil clamp and the sensor head body to prevent the working fluid leaking out and the rest of the fluid tube 1 is sealed to the end of the coil clamp. The ferrite cores and coil windings are exposed to the fluid since sealing them from it would not allow such a small gap to be used nor would it allow the detecting element 7 to intrude as far as is desired. It is the degree of intrusion of the end sections of the detecting element into the magnetic fields 8 (See FIG. 3) which determines the voltage drop across each coil. This is effected by the conductive end sections of the detecting element blocking more or less of the magnetic flux which crossed the gap of each ferrite core 4 and thus varying the inductance of each coil 5. The voltage drop across each coil 5 reflects these changes and so provides an output signal. A lip or raised circumference 10 on each end of the detecting element 7 as shown in FIGS. 2 and 3 can be used to improve the performance of this type of detection. Finally, the signal from the coils 5 is amplified and filtered to provide a suitable output for measurements or for use in other equipment.

Whereas other fluid loop sensors use electrical feedback in order to servo motors to obtain a measure of acceleration over a large bandwidth, the embodiment being described intentionally simplifies the operational dynamics to produce a sensor which has the minimum of interacting forces and consequently smaller operating bandwidths. The detecting element 7 is not held rigidly to a given position in the sensor head 6 at all times by a servo mechanism but is allowed to move freely and unconstrained—its position affected only by fluid flow and the light levitating action of the coils 5.

The only forces affecting the function of the sensor i.e. whether it behaves as an accelerometer or a displacement sensor over a given frequency bandwidth, are the viscous drag of the fluid in the circular tube 1 and the magnetomotive forces which act to centralize the detecting element 7 between the coils 5. Both of these forces act longitudinally along the tube but whereas the magnetomotive forces produce an effective restoring force of certain stiffness, the viscous drag is proportional to velocity and so vanishes when the relative velocity between the fluid and the tube is zero.

It is obvious that these two components together provide the detecting element with a damped simple harmonic oscillatory motion for small amplitudes. The basic factors which determine whether the motion is lightly or heavily damped are:
  (i) The voltage supplied to the coils, V.
  (ii) Dynamic viscosity of the liquid used in the fluid loop, n.
  (iii) Mass of the liquid used in the fluid loop, m.
  (iv) Diameter of the fluid loop, D.
  (v) Diameter of the fluid tube, d.
Now the equation of motion of the detecting element in the tube is, $$m\ddot{x} + \lambda\dot{x} + kx = 0 \tag{1}$$

where $\lambda$ is the drag coefficient, k is the stiffness of the levitating magnetomotive forces and m is the effective inertia of the fluid loop.

The levitating force is proportional to the product of the field strength and the induced eddy currents in the detecting element. These induced currents are themselves proportional to the field strength and thus the stiffness, k, is proportional to the square of the magnetic field strength. But the field strength is in turn proportional to the current in the coils and ultimately dependent on the voltage supplied to the coils so we can write $$k \alpha v^2 \tag{2}$$

In order to see how the damping depends on fluid viscosity and on other apparatus dimensions we must find an expression for the viscous drag in the tube. The pressure drop along a length, L, of the tube is given by, $$P = -32Lu^2 p / Red$$

where
  u = velocity of flow
  p = density of fluid
  d = tube diameter
  Re = Reynold's Number
By rewriting the pressure drop as drag force divided by cross-sectional area i.e.

$$P = \frac{F}{A} = -\frac{\lambda u}{\pi d^2/4}$$

and then substituting $Re = pud/n$, we obtain, $$\lambda u = -PA = \frac{8Lu}{/n} \cdot \pi$$

$$= 8\pi n L u$$

so $\lambda = 8\pi n L$
Finally, by putting $L = \pi D$ where D is the diameter of the fluid loop, we obtain $$\lambda \alpha n D$$

Now, by comparing the previous equation of motion for the detecting element with the standard one, $$\ddot{x} + 2\zeta\omega_n\dot{x} + \omega_n^2 x = 0 \tag{4}$$

we can equate the coefficients of each term to produce:

$$\omega_n \alpha \sqrt{k/m}, \text{ the natural frequency}$$

and $$\zeta \alpha \lambda / \sqrt{km}, \text{ the damping ratio}$$

Then substituting in the expressions for k and $\lambda$ derived above we get $$\omega_n \alpha \frac{V}{\sqrt{m}}$$

$$\zeta \alpha \frac{n}{\sqrt{m}} \frac{D}{V}$$

Figure 4:
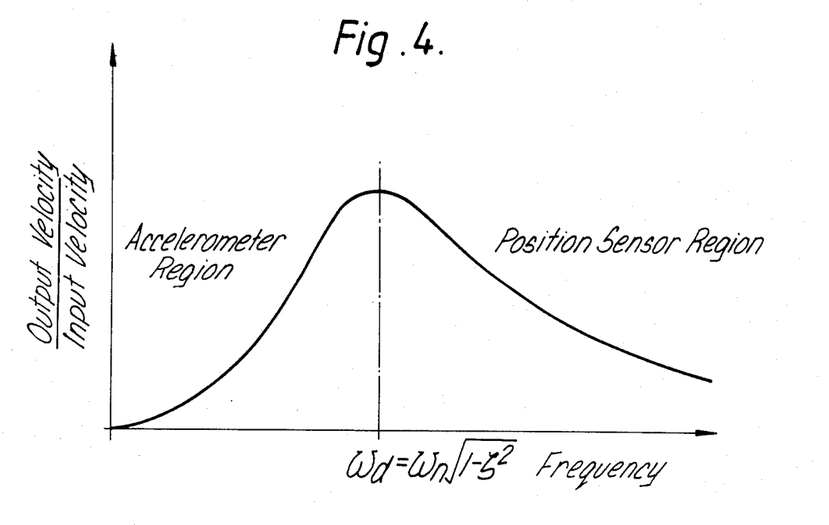
FIG. 4 shows a typical spectral response of a damped simple harmonic oscillator.

The natural frequency of the system would define the regions of the frequency spectrum in which the instrument could be used as a sensor of acceleration say or position. FIG. 4 shows a typical system's spectral response and the frequency regions in which it could be used as an accelerometer and a displacement sensor.

To best shown how the fluid loop sensor acts as an accelerometer, we need to consider the rotational acceleration of the sensor, $\ddot{\theta}$, as induced by an external source and the internal torque, T, supplied by the levitational stiffness which acts upon the fluid loop to match the internal fluid acceleration to that of the rest of the sensor, i.e.

$$T_{internal} = k \times \frac{D}{2} = m \frac{D^2}{4} \ddot{\theta}$$

where k=levitational stiffness, x=relative displacement of detecting element and $mD^2/4$=effective moment of inertia of the fluid loop $$x \alpha m D \ddot{\theta}/k \tag{7}$$

When the sensor undergoes angular acceleration about the axis of symmetry of the toroid, the inertia of the fluid causes the detecting element to lag behind the angular displacement of the rest of the fluid tube. The restoring force acting to drive this relative displacement back to zero accelerates the detecting element and fluid loop in proportion to the relative displacement which continues to increase until the fluid and sensor body accelerations are equal. The final displacement of the detecting element is then proportional to the sensor acceleration.

Figure 5:
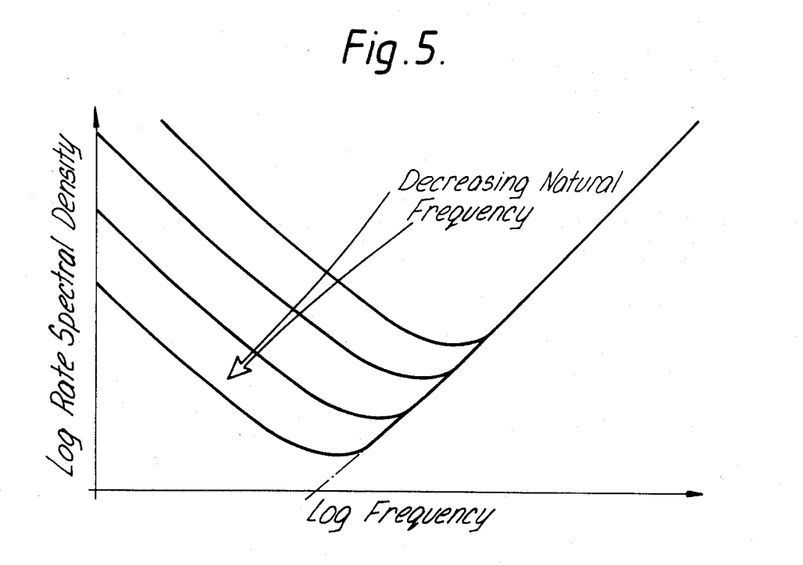
FIG. 5 illustrates the rate noise level for different frequency settings of the Fluid Loop Sensor.

Another way of analysing the performance with a view to improving the sensor capabilities is to look at the rate spectral density curve for this type of sensor. FIG. 5 shows the rate noise level for different natural frequencies but the same damping ratio and indicates the turning points which correspond to the damped natural frequencies. The region to the left of the turning point, where the sensor acts as an accelerometer shows the noise increasing steadily with decreasing frequency. This is to be expected since at low frequencies, the accelerations experienced are very small, being proportional to the square of the frequency. Thus the rate spectral density continues to increase and obviously swamps the detection of accelerations below a certain level.

The choice of lower natural frequency for the detecting element whilst maintaining the same damping ratio, brings the rate spectral density down over the whole of the accelerometer region, though the operational bandwidth for the accelerometer is reduced. Since the natural frequency is given by $\omega_n = \sqrt{k/m}$, a high value for m/k ratio improves the sensor signal whilst also, though not surprisingly, increasing the sensitivity of the device, (see Eqn. 7).

From these studies of spectral density curves, we believe that a very low natural frequency of oscillation for the detecting element will provide a sensor with very little noise.

It has already been noted that the intrusion of the detecting element into the circuit of magnetic flux associated with each coil is responsible for the change in voltage across the coils and hence the output signal. The movement of the detecting element out of one magnetic circuit and into the other causes the corresponding coil voltages to rise across one whilst falling across the other. This keeps the sum of the coil voltages approximately constant and causes the centre-tap voltage between the coils to swing according to the position of the detecting element. It is obvious too that the sensitivity of this type of pick-off will be improved if the regions of magnetic flux that are penetrated can be made small since almost the full voltage swing can be produced by movement equal to the width of the region of concentrated flux provided that the intruding element is a sufficiently effective block against magnetic flux. Careful choice of the ferrite core geometry will generate an efficient and compact region containing almost all the lines of flux.

The magnetic levitation of the detecting element is important in allowing direct contact with the fluid inertia to be maintained whilst no other contacts, which would introduce unwanted friction forces are present. Thus indeterminate signals, produced by the reaction to friction forces, such as those present in any bearing which could have been used to mechanically mount the detecting element, do not arise in this invention. The inherent noise in the output signal of this sensor is therefore minimal and enables very low levels of angular acceleration to be observed.

The natural frequency and damping ratio of the detecting element can be adjusted by changing the voltage supplied to the coils so that the levitational stiffness applied to the detecting element is altered, (see Equations 5 and 6). However, for fast responses to rotational stimuli it is best to choose the damping ratio to be approximately 0.7 and so for a given sensor fluid and tube dimensions, the a.c. voltage applied to the coils may have to lie within certain limits. This would then also define the natural frequency of the detecting element. There still remains some choice of natural frequency by choosing appropriate fluid viscosity and tube dimensions and in optimising the design for specific applications these would be taken into account. For example, to achieve the lowest practical natural frequency for the detecting element, without running into problems concerned with unsuitably large damping ratios or rather large fluid masses, the fluid loop diameter should be kept small and the sensor fluid itself should have a low dynamic viscosity. This would then allow the voltage applied to the coils to be set at a lower level to achieve the same damping ratio and provide a lower natural frequency for the same fluid mass.

The frequency of the excitation voltage supplied to the coils to provide the magnetic levitating forces is important to the size of the conductive end sections of the detecting element. In order to obtain a reasonably well defined variable reluctance in the magnetic circuit of a coil, the intruding conductive ends must be of a thickness equal to or greater than the skin depth to which the varying magnetic field can penetrate. For example, in the sensor described here, the applied excitation voltage was approximately 40 kHz because the raised ends of the detecting element were approximately 0.5 mm thick.

The arrangement of the coils and their ferrite cores can be used in order to optimise the geometry of the magnetic fields which penetrate into the fluid loop. This example has been chosen to show an arrangement where one pair of coils provides the levitation, centering force and the pick-off for the sensor and set the magnetic fields at approximately 45° to the tube axis. The shape of the ferrite core and in particular the geometry of the gap present in the core determines the effectiveness of this type of pick-off. A smaller gap, for example, ensures higher flux concentrations and so higher sensitivity to movements of intruding conductors.

Ferrofluids may be used to enhance the sensor's performance too by acting as a low friction seal to reduce the flow of fluid down between the detecting element and the fluid tube wall.

Alternative methods of detecting the relative displacement of the detecting element in the sensor head may be considered if it is found that the dominant factors in the spectral density curve of this new motion sensor are Johnson noise and 1/f noise. Alternative methods of detection which are inherently more sensitive than the one described above would require less signal amplification by subsequent electronics and so would introduce less of the noise associated with these circuits.

Four such alternative methods of movement detection will now be described with regard to FIGS. 6 to 9 of the accompanying drawings.

Referring now to FIG. 6, the structure of the sensor is very similar to that shown in FIGS. 1, 2 and 3. The core 4 is of a material that has high magnetic permeability and the coil windings 5 produce alternating magnetic fields as previously described and 6 is the outer body of the sensor. A ring of electrically good conductive and non-ferromagnetic material 9 is mounted at both ends of the detecting element 7. A ferrofluid 10 is chosen to be immiscible with the rest of the fluid which fills the fluid loop and lies under the windings 5 inside the tube 6 such that it completes the circuit of high permeability material and isolates the fluid on one side of the detector from that on the other side. As the detecting element moves, the conductive rings 9 stay in contact with the ferrofluid 10 but distort it and thus experience repulsive forces which levitate and restore the detecting element to a centralized postion as described previously.

The dynamics of the detector and the method of measuring its motion by using the varying inductance of the coils is similar to that previously described.

Referring now to FIG. 7, the method of motion detection in this embodiment is based on capacitance variations. The dynamics and method of providing levitation and centralisation are the same as previously described but two additional wire gauzes 12 are now located and fixed to the sensor body just beyond the two ends of the detecting element 7 and an extra ring 11 is supported at the centre of the detecting element 7.

An electrical alternating signal is applied to the wire gauzes 12 through the sensor body 6 and an insulating ring 13 via an insulated wire 14. The sensor body 6 is made of electrically conductive material and is earthed and insulated from the alternating signal applied to the wire gauzes 12. The two end sections of the detecting element 7 and the ring 11 are electrically conductive and are electrically connected. The alternating signal applied to the wire gauze 12 at one end of the sensor is referenced to the wire gauze at the other end and not with respect to the earthed sensor body. This means that the detecting element 7 is effectively earthed through the low impedance capacitance provided by the ring 11 to the sensor body and thus the centre tap of the drive signal carries an a.c. signal whose magnitude depends on the differences in capacitance values created between the wire gauzes and the end sections of the detecting element.

Figure 8:
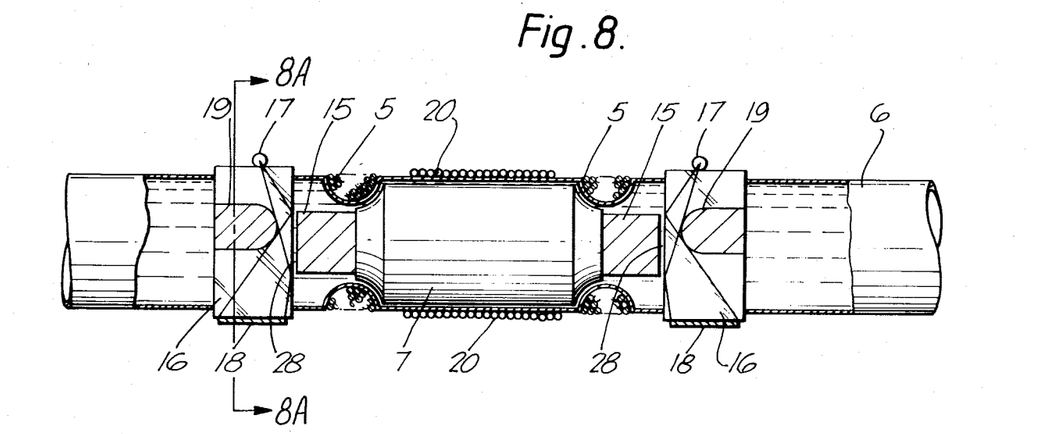
FIG. 8 is an axial section through the sensor head of an embodiment in which movement detection is by the evanescent mode of propagation of electromagnetic radiation.
Figure 8A:
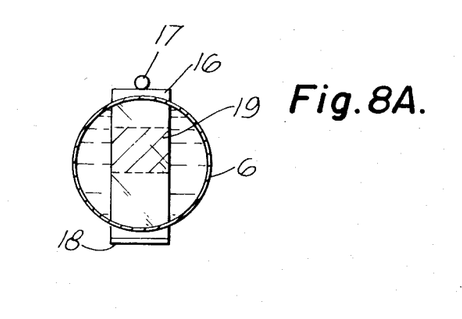
FIG. 8A is a section taken along line 8A—8A of FIG. 8.

Referring now to FIG. 8, this shows an embodiment in which a neutrally-buoyant conductive float 7 is confined in fluid within a tube 6 by magnetic levitation coils 5 fed with alternating current at a frequency of the order of 20 kHz. The float carries at either extremity absorbers 15 made of some optically attenuating but optically workable substance, for example black stained glass.

The optically flat outer surfaces of the absorbers are separated by gaps 28, which are exaggerated in width in the Figure for purposes of clarity, from transparent blocks 16 made of an optically workable medium of refractive index higher than the fluid. Infra-red or optical radiation sources 17 are arranged to illuminate corresponding radiation detectors 18 by using total internal reflection from the inner face of the blocks 16 adjacent to the gaps 28. Direct transmission is prevented by the inclusion of the baffles 19 of opaque material placed into the blocks 16.

The operation of the device is as follows: When the float 7 carrying the absorbers 15 moves in response to minute displacements of the vehicle carrying the fluid loop of which the tube 6 forms a part the width of the gaps 28 is changed. If the dimensions of the apparatus are chosen so that the undisturbed size of the gaps is of the order of 0.2 wavelengths of the radiation emitted by the sources 17 then any such changes in the gap widths will lead to a progressive diversion of the radiation from total internal reflection to transmission into and absorption by the absorbers 15 and vice versa, depending on the sense of the gap change.

Maintaining the nominal condition of the gaps 28 is assisted, for the first part, if closed loop control is applied to the mean gapwidth as measured by the detectors 18 using modulation of power to a heater 20 mounted in close connection with the tube 6 between the blocks 16 and, for the second part, if closed loop control, albeit with a low bandwidth, is applied to the differential gapwidth as measured by the detectors 18 using modulation of power to the levitation coils 5.

The use of evanescent mode readout gives the highest known sensitivity and the lowest known angular noise characteristic to the device. The reasons for this are that the amplitude of this mode decays rapidly at highly refractive boundaries where total internal reflection takes place, small changes in the thickness of the material sandwiched between optically denser materials causing large differences in the amplitude of the emerging propagation.

Figure 9:
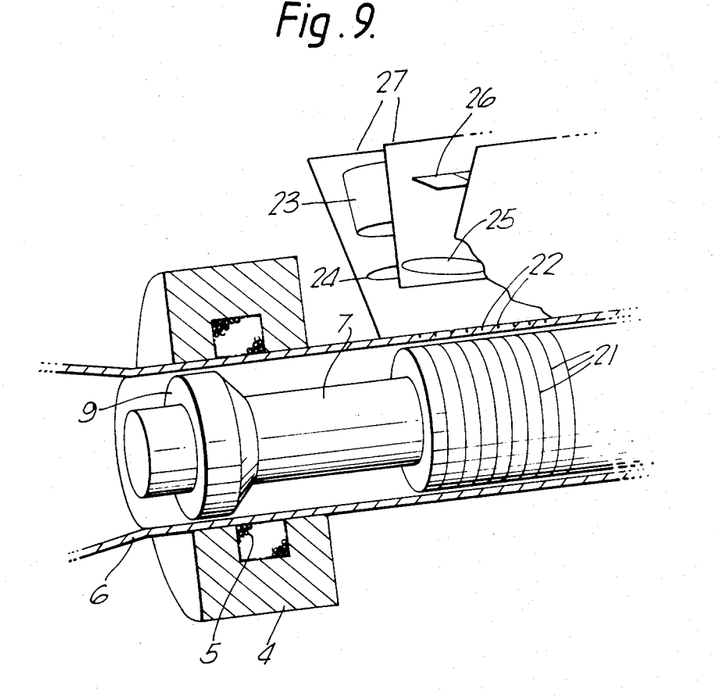
FIG. 9 is a section through the sensor head similar to those of FIGS. 6 and 7 in which movement is detected by use of Moire fringe patterns.

Finally referring to FIG. 9, the movement detection method in this embodiment is based on the production of Moiré fringe patterns. The dynamics and method of providing levitation and centralization are as previously described but the detecting element 7 now supports many rings of reflective lines 21. Similarly spaced lines 22 of optically opaque material are located on the otherwise transparent sensor body 6. The width of each reflective ring 21 is equal to the width of the non-reflective strip in between and similarly, the widths of the optically opaque lines 22 are equal to those of the transparent spaces in between.

A collimated source of light 23 is directed onto the array of lines through a cylindrical lens 24 to achieve optimum illuminance. If the reflective lines 21 are directly under the transparent gaps between the opaque lines 22, then the light will be transmitted and reflected back through the sensor body. A focussing lens 25 then concentrates the reflected light onto a pair of photosensitive cells 26. The light baffles 27 prevent any light from the source 23 illuminating the photosensitive cells 26 unless it has been reflected back from the detecting element. If the reflective lines 21 lie under the opaque lines 22 then no light is reflected back to the photosensitive cells 26. Thus movement of the detecting element and the array of reflective lines 21 causes a change in the electrical output from the photosensitive cells. The sensitivity of this method of detection is dependent on the widths and spacings used for the lines 21 and 22, greater sensitivity being achieved with narrower lines, but it is restricted by diffraction through the spacings and the separation of the two arrays of lines.

We claim:

1. A rotational motion sensor comprising a fluid loop and a piston to act as the detecting element which is magnetically levitated to keep it from direct contact with any part of the sensor other than the fluid itself, and which moves in proportion to the motion of the element of fluid it substitutes and which behaves in all dynamical respects to high accuracy as a damped simple harmonic oscillator with respect to the body and tube of the sensor.

2. A motion sensor according to claim 1, whose moving parts offer no friction forces of any sort other than viscous drag and whose detecting element is subject to a restoring force which is produced purely electromagnetically and involves no mechanical transfer of the force.

3. A sensor according to either claim 1 in which the movement of the detecting element is measured using a variable magnetic reluctance pick-off.

4. A rotational motion sensor according to claim 1 which is capable of directly sensing angular acceleration, angular velocity and angular displacement of certain frequency components of a given motion where the components concerned are defined by adjustable bandwidths.

5. A sensor according to claim 1 whose sensor characteristics are adjustable and whose noise spectral density at frequencies below the natural frequency of the detecting element is also adjustable by altering the supply voltage to the sensor head.

6. A sensor according to claim 1 which uses ferrofluids in the magnetic flux circuits of either the magnetic levitation system or the magnetic reluctance pick-off system to enhance the performance of the sensor by acting as a low friction, flexible seal.

7. A sensor according to claim 1 wherein the relative displacement of the detecting element with respect to the sensor body is measured optically by detecting the degree of propagation of the evanescent mode across an optical boundary where total internal reflection occurs.

8. A sensor according to claim 1 wherein the relative displacement of the detecting element with respect to the sensor body is measured optically by a Moiré fringe method.

9. A sensor according to claim 1 wherein the relative displacement of the detecting element with respect to the sensor body is measured using capacitive methods.

* * * * *